Sept. 19, 1961 R. E. REINHARDT 3,000,100
SIGHT MEASURING INSTRUMENT
Filed April 20, 1960 3 Sheets-Sheet 1
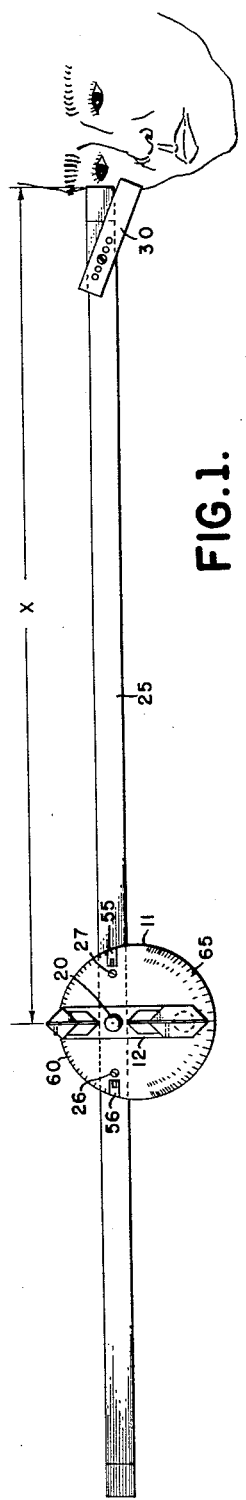
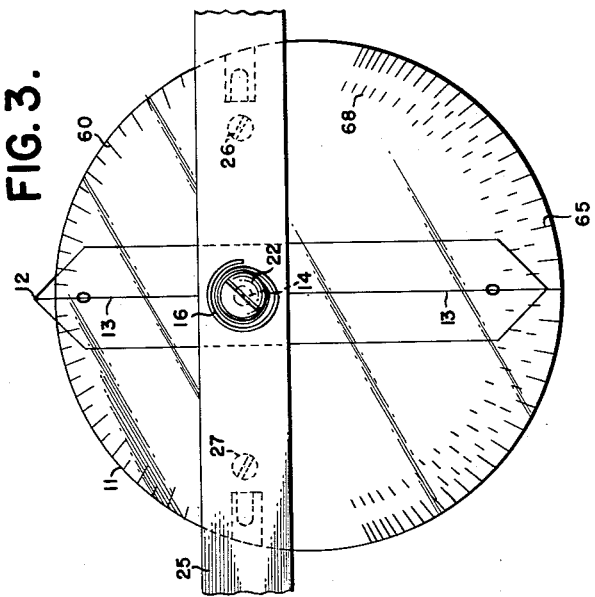
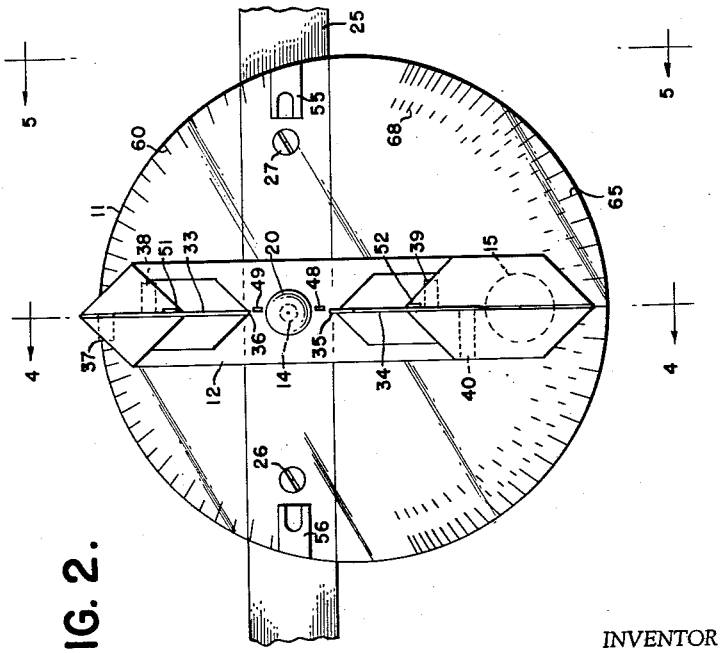
INVENTOR
ROBERT E. REINHARDT
BY *[signature]*
ATTORNEY

INVENTOR
ROBERT E. REINHARDT

Sept. 19, 1961  R. E. REINHARDT  3,000,100
SIGHT MEASURING INSTRUMENT

Filed April 20, 1960  3 Sheets-Sheet 3

INVENTOR
ROBERT E. REINHARDT

BY
*signature*
ATTORNEY

United States Patent Office 3,000,100
Patented Sept. 19, 1961

3,000,100
SIGHT MEASURING INSTRUMENT
Robert E. Reinhardt, 3483 S. Utah St., Arlington, Va.
Filed Apr. 20, 1960, Ser. No. 23,586
4 Claims. (Cl. 33—64)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to an instrument for making measurements by sight from a point location, and is intended primarily for use by foresters in measuring standing timber. It is simple of construction, easily carried, and sufficiently accurate to give results within the error permitted by timber survey.

Figure 4:
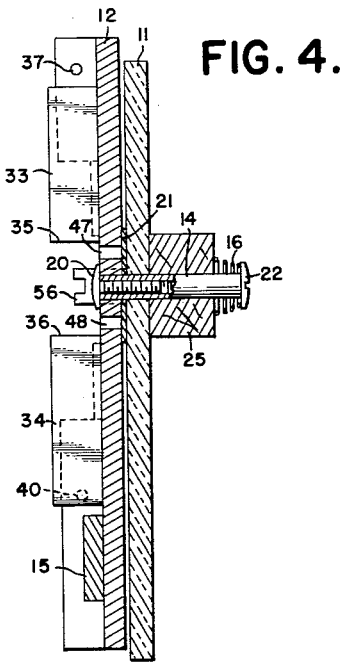
Figure 6:
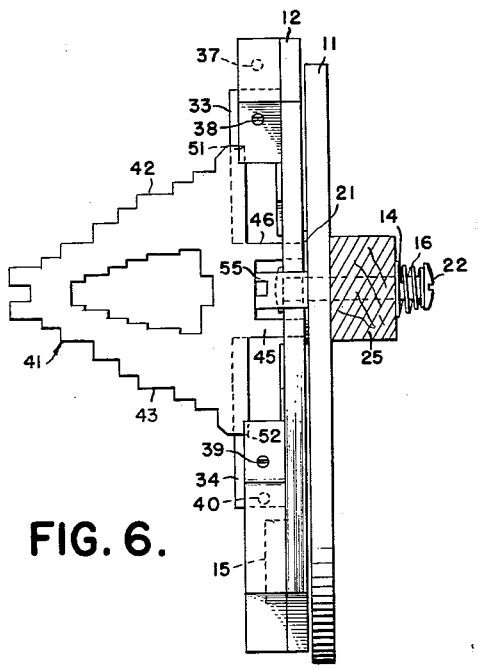
Figure 5:
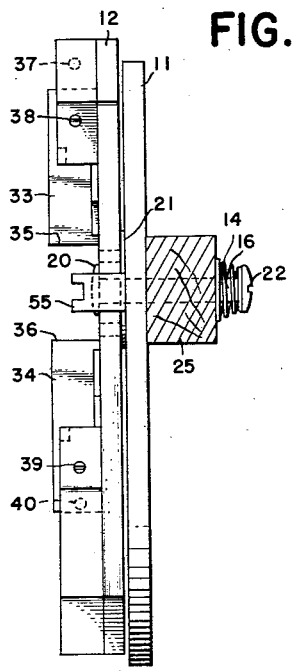
Figure 7:
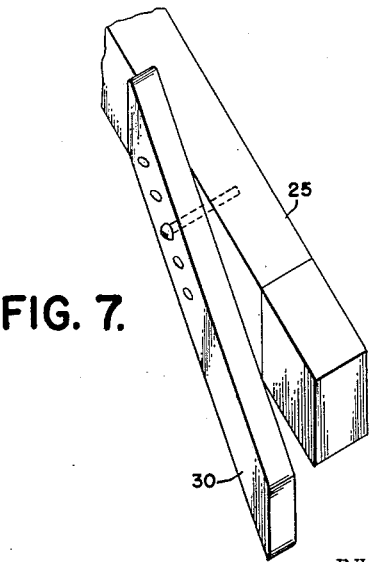
Figure 8:
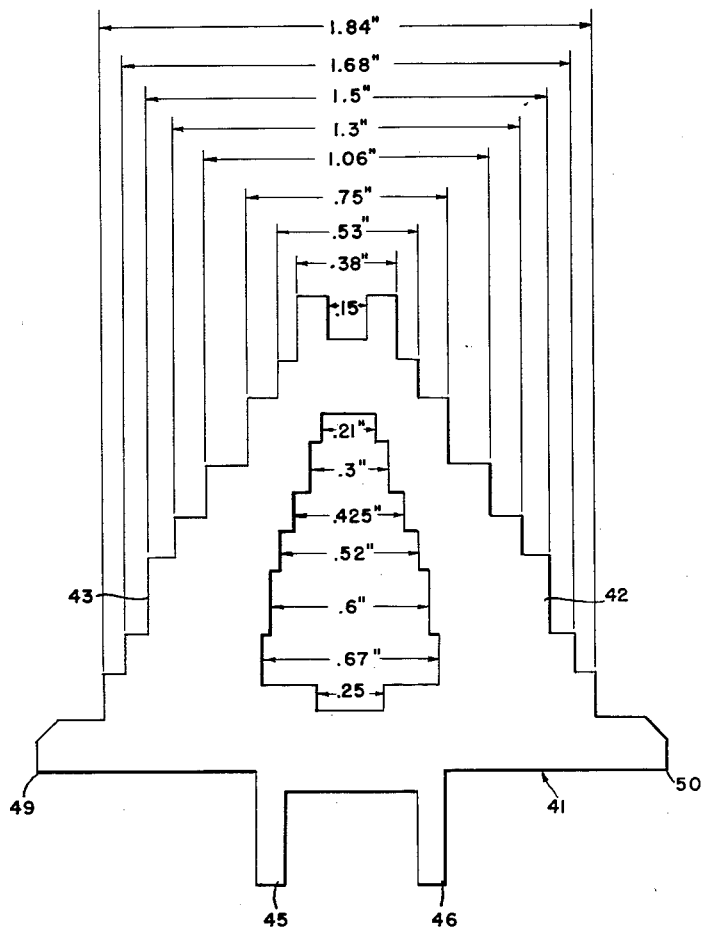

The instrument is illustrated in detail in the accompanying drawing in which:

FIG. 1 is a side view of the instrument;
FIG. 2 is an enlarged view of a portion of the same side of the instrument as shown in FIG. 1;
FIG. 3 is a view corresponding to FIG. 2, but showing the opposite side;
FIG. 4 is a section along line 4—4 of FIG. 2;
FIG. 5 is a section along line 5—5 of FIG. 2;
FIG. 6 is a view similar to FIG. 5, but showing an added gage;
FIG. 7 is an enlarged three dimensional view of a detail; and
FIG. 8 is a view of the gage added in FIG. 6 illustrating details and dimensions of the gage.

Referring to the drawing, the instrument is provided with a stationary member in the form of a transparent plate 11. A pivoting member in form of an elongated cursor 12 provided with a scale traversing line 13 is pivotally mounted on the plate 11 by means of a pivot pin 14. The cursor is weighted by weight 15 and is also mounted off-center on the pivot pin. Consequently, the cursor, when allowed to pivot freely with the weight hanging downward, will plumb itself, that is it will assume a normal gravity controlled position, with its center of gravity vertically positioned under its pivotal axis.

A hand operated brake is provided for locking the cursor against and releasing it for pivotal movement on the plate. For this purpose pivot pin 14 is longitudinally slidable in the cursor and plate. A compression spring 16 normally biases the head 20 of the pivot pin against the cursor, urging the cursor into frictional engagement with a spacing washer 21 acting as friction member provided between the cursor and plate, thus to lock the cursor against pivotal movement. The user of the instrument may counteract the bias of the spring by pressing the pin head 22, thus to release the cursor for pivotal movement.

Means is provided for positioning the pivotal axis of the cursor a predetermined distance from the eye of the user. To this end the plate and cursor are mounted on a stick 25 by means of screws 26 and 27, such distance from one end of the stick that when the end of the stick is placed at the side of the eye the pivotal axis of the cursor will fall a predetermined distance X from the eye. An adjustable cheek engaging member 30 is provided on the end of the stick to aid the user properly to place the stick.

Strips 33 and 34 are carried by the cursor, the adjacent edges 35 and 36 of which function as a pair of sighting elements. The sighting elements are positioned a predetermined distance apart such that they are in vertical alignment when the pivoting member is in its normal gravity controlled position and such that the pivotal axis of the cursor falls midway between them. The sighting elements are locked in place on the cursor by clamp screws 37, 38, 39, and 40. These screws may be loosened and sighting elements moved to new locations to adjust the predetermined distance the sighting elements are apart.

A gage 41 is provided with a plurality of pairs of spaced elements such as spaced edges 42 and 43, for example. The distance between the two spaced elements of any pair is predetermined and is different than that of any other pair.

The gage may be used as a distance gage for setting the sighting elements by placing it with any desired pair of its spaced elements between edges 35 and 36, the edges being then brought into engagement with the selected pair of spaced elements of the gage and the strips 33 and 34 locked in place.

The gage is also provided with means for mounting it on the pivoting member 12 in such manner that the pivotal axis falls midway between the spaced elements of any pair on the gage. To this end the gage is provided with tabs 45 and 46 which are fitted into apertures 47 and 48 provided in the pivoting member. The corners 49 and 50 of the gage are wedged into slots 51 and 52 in the pivoting member. With the gage mounted on the pivoting member, the plurality of pairs of spaced elements may be used as a plurality of pairs of sighting elements. This manner of use of the gage is a convenience over resetting the sighting elements for each use where a different setting is needed.

As a convenience in sighting at any point, sights 55 and 56 are stationarily mounted on the plate 11 such that when the user places the end of the stick properly beside his eye and sights along the sights at any point, his line of sight coincides with the pivotal axis of the cursor.

The gage is conveniently provided with a circular degree scale 60 centered on the pivotal axis of the cursor, the zero point of the scale coinciding with the scale traversing line 13 of the cursor when the line of sight is horizontal and the cursor is plumb. The degree scale is provided both directions from the zero point. The eye to point angle of slope in degrees of any point observed by the user along the line of sight is determined simply by sighting the instrument at the observed point with the brake released and the cursor hanging down and then operating the brake to lock the cursor in its plumbed position. If the observed point is inclined, the angle of slope is read on the degree scale coinciding with the scale traversing line at one side of the zero point. If the point is declined, the reading appears on the degree scale on the opposite side of the zero point.

A scale 65 is also provided and is traversed by the scale traversing line such that any index number on scale 65 coinciding with the scale traversing line is the tangent of the corresponding angle of slope. Thus the percent rise or drop (slope) of the observed point along the line of sight is read on scale 65.

If the user positions himself horizontally 100 feet from the observed point (range distance) sights the instrument at the point and plumbs the cursor, the elevation, or drop, of the point relative to his eye is read directly on scale 65. For a range which is a multiple of 100 feet, the user corrects the elevation by multiplying the observed elevation by that multiple.

A scale 68 is also provided which is similar to scale 65 except scale 68 is $66/100$ of scale 65. Thus the user may position himself one chain (66 feet), or multiple thereof, from the observed point and make his observation, reading the elevation or drop, or its multiple, on scale 68.

All the scales are inscribed in mirror image on the side of the transparent plate 11 as viewed in FIG. 2, and the scale traversing line 13 is inscribed on the back of the cursor. In reading the instrument the scales and line are viewed from the opposite side (see FIG. 3) through the transparent plate. The index numbers, except the zero, have been omitted for all the scales from the drawing to avoid confusion.

The instrument as shown is designed for a right hand user. In this event the plate 11 is grasped in the right hand with a finger free to push head 22 of the pivot pin for releasing the brake and with the end of the stick positioned along side the right eye.

As will be noted from the drawing plate and cursor assembly is symmetrical with respect to the line through the zero index mark of all the scales and through the pivotal axis of the cursor. To adapt the instrument for a left hand user the plate and cursor assembly are reversed and mounted on the opposite side of the stick.

The instrument has many uses in addition to the previously mentioned eye to point measurements of slope angle, percent rise or drop, and elevation or drop. With the gage dimension shown in FIG. 8, it is useful to foresters in determining the average basal area of standing timber per acre. A known procedure for this purpose involves the sighting of all observable trees from one or more selected locations to observe their diameters at shoulder height, the sighting being taken by positioning two sighting elements, a fixed, predetermined, distance apart horizontally and a fixed, predetermined, distance from the user's eye, the sighting elements being kept normal to the line of sight. Instruments for this purpose are known as angle-gages. See for example Occasional Paper #145, published by the Southern Forest Experiment Station, Forest Service, U.S.D.A., Title "Better Diagnosis and Prescription in Southern Forest Management" by L. R. Grosenbaugh.

The procedure works well on substantially level terrain. The present instrument can be used similarly by locking the cursor with the line joining the sighting elements 35 and 36 normal to the line of sight.

However, if the terrain is uneven, the present instrument is especially useful for the purpose. In this event, the user first sights the instrument at the base (shoulder height) of the tree to be observed and plumbs the cursor. He then locks the cursor against rotation, which sets the instrument on the slope angle, turns the instrument to bring the sighting elements horizontal, and makes his observation of the tree. The change from normal of the angle of the line joining the sighting elements to the line of sight resulting from the elevation of the tree, compensates for the change in elevation from level of the tree.

Although the particular predetermined dimensions may be varied, a satisfactory and easily handled instrument is obtained with X fixed at 24.75 inches and with the gage dimensions corresponding to those shown in FIG. 8 of the drawing.

The distances shown on the outside of the gage in FIG. 8 are conveniently related to the aforementioned use of the instrument in determining the average basal area of standing timber per acre. When the pivotal axis of the cursor is 24.75 inches from the eye, the eight distances shown, from .38 inch to 1.84 inches, comprise the proper settings for the following eight gage sizes: X2½, X5, X10, X20, X30, X40, X50, X60. (See Occasional Paper #145 before referred to.)

The interior distances shown on the gage, namely .15 inch, .21 inch, .3 inch, .425 inch, .52 inch, .6 inch, and .67 inch are 40% respectively of the first seven gage sizes mentioned above. The interior distances are used for determining a pre-established top diameter for tree merchantability estimates when the top diameter is taken as a percent of the diameter of a tree at shoulder height, as will be later more fully explained.

The user may also use the instrument to locate himself a preselected horizontal distance from a given point, for example, a mark made on the trunk of a tree, regardless of contour of the terrain. To illustrate the procedure, the sighting elements are set 1.5 inches apart. On a tree at shoulder height, a horizontal mark spanning 24 inches is provided. From a location elevated either above or below the mark and normal to it, the instrument is sighted at the mark, plumbed and the cursor is locked in the plumbed position. The instrument is then turned until the sighting elements lie approximately horizontal (this may be estimated) and the user walks backward or forward, if necessary repeatedly replumbing the cursor, until the sighting elements intercept the 24 inch span. At this location the eye will be 33 feet horizontally from the mark regardless of the eye to point slope.

Having thus located himself, the user can determine the height of the tree by taking two elevation readings, one at the stump height and the other at the top, reading ½ of scale 68 following the before described procedure for making eye to point elevation or drop measurements. The difference in these elevations, or their sum if the stump height is below and the top is above level, is the tree height.

If in the above illustration the sighting elements are set at .5 inch distance apart instead of the 1.5 inches distance, the user will locate himself 99 feet from the mark, and the eye to point elevations can be read directly on scale 65. The 99 feet may be assumed to be 100 feet, since any error thus introduced is negligible relative to the overall accuracy of the instrument and the error is permissible in timber survey work. Setting the sighting elements .75 inch apart would locate the user 1 chain from the mark.

With this instrument and a measuring tape, the user may determine the diameter of a tree trunk, at any desired height. To illustrate the procedure, the end of the tape is fastened to the side of a tree near ground level and extended approximately horizontally in a direction where the trunk at the desired height can be seen. The horizontal positioning of the tape may be estimated with sufficient accuracy, but it may also be checked simply by taking a sighting with the instrument from a position on the tape at a point on the tree at eye height, plumbing the cursor, and checking deviations of the angle of slope from zero. The instrument, with the sighting elements positioned a predetermined distance apart (for example 1.5 inches), is sighted at a selected point on the tree trunk at the desired height and the cursor is plumbed. The cursor is then locked and the instrument turned to bring the sighting elements horizontal. The instrument is sighted at the selected point. The user adjusts his position to or from the tree along the tape, repeatedly replumbing the cursor and resighting at the selected point, until the sighting elements intercept the trunk diameter. When this occurs the distance is read on the tape. This distance divided by 1.375, for the 1.5 inches setting of the sighting elements, gives the diameter of the trunk, in inches, at that point.

If a setting other than 1.5 inches for the sighting elements be used, the appropriate divisor constant is applied. The following table lists the constants for various settings of the gage:

| Distance apart of sighting element, inches: | Constant |
|---|---|
| 0.38 | 5.500 |
| 0.53 | 3.890 |
| 0.75 | 2.750 |
| 1.06 | 1.944 |
| 1.30 | 1.59 |
| 1.50 | 1.375 |
| 1.68 | 1.23 |
| 1.84 | 1.08 |

The various distances in the first column of the table are found on the gage of FIG. 8.

The instrument can also be used to determine the location near the top of the tree of a pre-established diameter for tree merchantability estimates. To illustrate the procedure, assume it is desired to determine the position of an 8 inch diameter. The sighting elements are set .25 inch apart. The user positions himself 1 chain horizontally away from the tree in a location where he can see the top. He estimates approximately the point on the tree where the 8 inch top is, and repeatedly checks his estimates by sighting the instrument at the top, plumbing the cursor, locking it, turning it to bring the sighting elements horizontal, the while maintaining his position. When a point is found where the sighting elements intercept the top, the diameter at that point is 8 inches.

The instrument can also be used to determine the merchantable top diameter when such diameter is based on a percentage of the diameter of a tree at shoulder height. Commonly this percentage is 40% of the shoulder height diameter. To illustrate the procedure the gage is mounted on the pivoting member and the user takes a position from which the point where the top diameter is to be taken may be seen and at a distance from the tree such that a sight from any one pair of the exterior gages, except the 1.84 inch, intercepts the tree at shoulder height. Then the corresponding interior gage is repeatedly checked against the estimated top location in the manner described for location of the 8 inch top until the top intercepts the opening. For example, if the 1½ inch gage intercepted a 40 inch tree diameter at shoulder height, the .6 inch opening would be used to find the 16 inch merchantable top.

By using various foregoing described procedures, it is obvious that the user from a position at a known distance from a tree, say 1 chain, may readily determine the point near the top of a tree at its minimum marketable diameter, say 8 inches, and the elevation of this point above the marketable base point, or the total marketable height of the tree. If the marketable base point is taken as shoulder height only the elevation of the top point is necessary. The measurements thus made are sufficient for determining the marketable tree volume.

I claim:

1. A measuring instrument comprising a stationary member, a pivoting member pivotally mounted on the stationary member, a brake for locking the pivoting member against and releasing it for pivotal movement on the stationary member, said pivoting member being weighted so as to assume a normal gravity controlled position when the brake is released, means for positioning the pivotal axis of the pivoting member a predetermined distance from the eye of the user of the instrument, and at least one pair of sighting elements carried by the pivoting member, the two sighting elements of the pair being positioned a predetermined distance apart such that they are in vertical alignment when the pivoting member is in its normal gravity controlled position and such that the pivotal axis of the pivoting member falls midway between them.

2. The instrument of claim 1 characterized in that the two sighting elements are movably mounted on the pivoting member so that the distance they are apart is adjustable.

3. The instrument of claim 1 characterized in that there are a plurality of pairs of sighting elements, the distance between the two sighting elements of any pair being different than that of any other pair.

4. The instrument of claim 2 in combination with a gage provided with a plurality of pairs of spaced elements, the distance between the two spaced elements of any pair being different than that of any other pair, the gage being adapted for use of the different pairs of spaced elements to gage the setting of the distance apart of the sighting elements, and means for mounting the gage on the pivoting element such that the pivotal axis of the pivoting member falls midway between the spaced elements of any pair, whereby the plurality of pairs of spaced elements may be used as a plurality of pairs of sighting elements.

References Cited in the file of this patent

UNITED STATES PATENTS

| 2,334,739 | Zak | Nov. 23, 1943 |
| 2,652,627 | Vickery | Sept. 22, 1953 |

FOREIGN PATENTS

| 1,505 | Great Britain | Jan. 30, 1915 |
| 8,896 | Great Britain | June 16, 1915 |
| 133,479 | Austria | May 26, 1933 |
| 805,292 | France | Aug. 22, 1936 |
| 59,459 | Norway | June 7, 1938 |